(12) United States Patent
Chiou

(10) Patent No.: US 8,166,569 B1
(45) Date of Patent: May 1, 2012

(54) MULTIAXIAL POLYETHYLENE FABRIC AND LAMINATE

(75) Inventor: Minshon J. Chiou, Chesterfield, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 1554 days.

(21) Appl. No.: 11/605,663

(22) Filed: Nov. 29, 2006

(51) Int. Cl.
*B32B 5/12* (2006.01)
*B32B 5/04* (2006.01)
*B32B 5/08* (2006.01)

(52) U.S. Cl. ............ 2/2.5; 442/104; 442/134; 442/135; 442/136; 428/105

(58) Field of Classification Search ...... 2/2.5; 89/36.02, 89/36.05; 428/911, 102, 105, 107; 442/134, 442/135, 102, 104, 149, 168, 169, 170; 139/387 R
See application file for complete search history.

(56) References Cited

U.S. PATENT DOCUMENTS

| | | |
|---|---|---|
| 3,094,511 A | 6/1963 | Hill, Jr. et al. |
| 3,354,127 A | 11/1967 | Hill, Jr. et al. |
| 3,673,143 A | 6/1972 | Bair et al. |
| 3,819,587 A | 6/1974 | Kwoleck |
| 3,869,429 A | 3/1975 | Blades |
| 4,137,394 A | 1/1979 | Meihuizen et al. |
| 4,172,938 A | 10/1979 | Mera et al. |
| 4,183,993 A | 1/1980 | Benstead et al. |
| 4,356,138 A | 10/1982 | Kavesh et al. |
| 4,413,110 A | 11/1983 | Kavesh et al. |
| 4,457,985 A | 7/1984 | Harpell et al. |
| 4,916,000 A | 4/1990 | Li et al. |
| 5,160,776 A | 11/1992 | Li et al. |
| 5,173,138 A | 12/1992 | Blauch et al. |
| 5,437,905 A | 8/1995 | Park |
| 5,677,029 A | 10/1997 | Prevorsek et al. |
| 5,702,657 A | 12/1997 | Yoshida et al. |
| 5,766,725 A | 6/1998 | Hogenboom et al. |
| 5,935,678 A | 8/1999 | Park |
| 6,000,055 A * | 12/1999 | Citterio .............................. 2/2.5 |
| 6,737,368 B2 * | 5/2004 | Chiou ........................... 442/134 |
| 6,841,492 B2 | 1/2005 | Bhatnagar et al. |
| 2002/0164911 A1 | 11/2002 | Cunningham et al. |

(Continued)

FOREIGN PATENT DOCUMENTS

EP 0 805 332 A2 5/1997

(Continued)

OTHER PUBLICATIONS

W. Black et al., Interscience Publishers, 1968, Man-Made Fibers—Science and Technology, vol. 2, Section titled Fiber-Forming Aromatic Polyamides, p. 297. This was resumbitted by Applicant in its entirety (originially sent IDS dated Feb. 13, 2007).*

(Continued)

*Primary Examiner* — Arti Singh-Pandey

(57) ABSTRACT

Provided is a multiaxial fabric comprising a first layer comprising a first layer comprising substantially parallel resin-free polyethylene yarns oriented in a first direction; a second layer comprising substantially parallel resin-free polyethylene oriented in a second direction, the first and second directions being skew with respect to each other; a layer, interposed between and in contact with each of the first and second layers, and comprising a thermoplastic or thermoset film; and a yarn interlaced transversely among each of the layers of the multiaxial fabric.

18 Claims, 1 Drawing Sheet

1st layer of substantially parallel resin-free polyethylene yarns
a layer of thermoplastic or thermoset film between 1st and 2nd layer
loop-forming yarn interlaced transversely among each of the layer
2nd layer of substantially parallel resin-free polyethylene yarns

U.S. PATENT DOCUMENTS

| | | |
|---|---|---|
| 2003/0228815 A1 | 12/2003 | Bhatnagar et al. |
| 2004/0045428 A1 | 3/2004 | Citerrio |
| 2004/0132368 A1 | 7/2004 | Price et al. |
| 2005/0081571 A1 | 4/2005 | Bhatnagar et al. |
| 2009/0136706 A1* | 5/2009 | Chiou .......................... 428/105 |
| 2009/0247031 A1* | 10/2009 | Chiou .......................... 442/135 |
| 2009/0271903 A1* | 11/2009 | Chiou ................................ 2/2.5 |

FOREIGN PATENT DOCUMENTS

| | | |
|---|---|---|
| WO | WO 93/20400 | 10/1993 |
| WO | WO 00/77283 A2 | 12/2000 |
| WO | WO 01/78975 A1 | 10/2001 |
| WO | WO 02/101319 A1 | 12/2002 |
| WO | WO 2004/099704 A1 | 11/2004 |
| WO | WO 2005/066577 A1 | 7/2005 |
| WO | WO 2007/067949 A2 | 6/2007 |
| WO | WO 2007/067949 A3 | 6/2007 |

OTHER PUBLICATIONS

B. Brew, P.J. Hine, I.M. Ward, The Properties of PIPD-Fibre/Epoxy Composites, Composites Science and Technology, vol. 59, 1999, p. 1109.

O.C. Van Der Jagt and A. Beukers, The Potential of a New Rigid-Rod Polymer Fibre ('M5') in Advanced Composite Structures, Polymer, vol. 40, 1999, p. 1035.

D.J. Sikkema, Design, Synthesis and Properties of a Novel Rigid Rod Polymer, PIPD or 'M5': High Modulus and Tenacity Fibres with Substancial Compressive Strength, Polymer, vol. 39, 1998, p. 5981.

E.A. Klop and M. Lammers, XRD Study of the New Rigid-Rod Polymer Fibre PIPD, Polymer, vol. 39, No. 24, 1998, p. 5987.

J.C.L. Hageman, J.W. Van Der Horst, R.A. De Groot, An Ab Initio Study of the Structural and Physical Properties of a Novel Rigid-Rod Polymer; PIPD, Polymer, vol. 40, 1999, p. 1313.

* cited by examiner

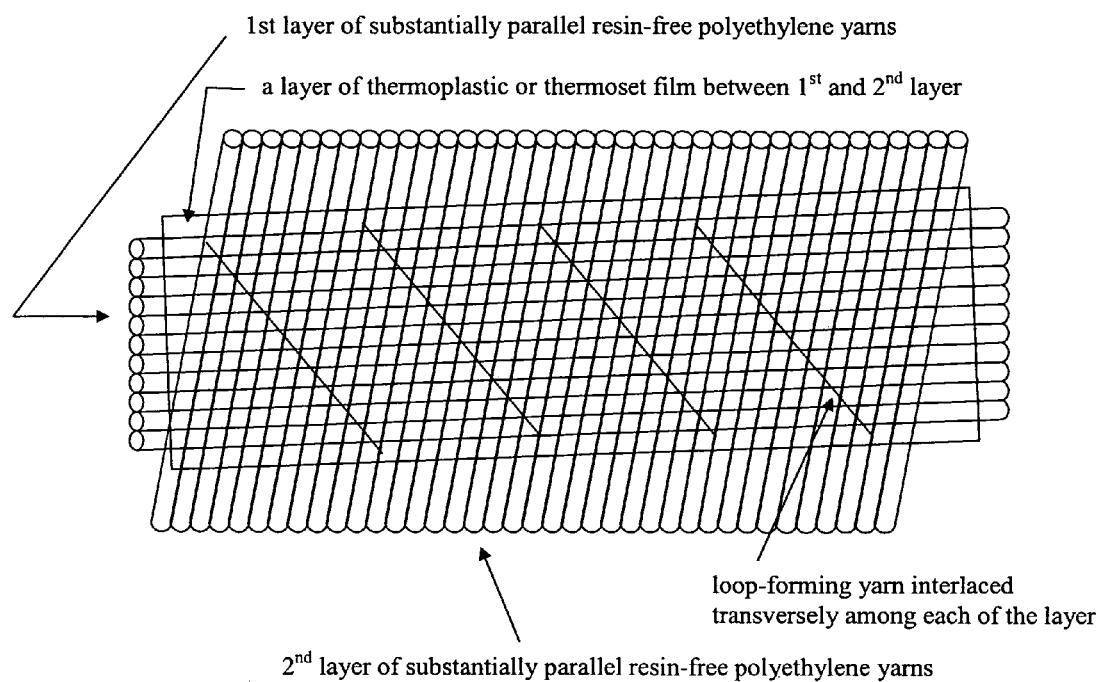

MULTIAXIAL POLYETHYLENE FABRIC AND LAMINATE

FIELD OF THE INVENTION

The present invention is related to a multiaxial fabric useful in ballistic applications.

BACKGROUND OF THE INVENTION

Personal ballistic body armor, such as vests, helmets, and other articles, are formed generally of materials which serve to prevent penetration of a bullet or other projectile, and any other object that is forcefully applied to the armor, such as a knife. These articles are used for the armed forces, police and civilian applications. There is a growing demand to improve the wearability and the overall effectiveness of armor systems used by soldiers and police offices in combative environments. Overall thickness and weight of armor systems can affect wearability, but reducing these parameters in currently known systems can compromise the armor's effectiveness against penetration.

Certain constructions are known in the art. See, for example, U.S. Patent Application Nos. 2002/0164911, 2003/0228815, 2004/0045428, 2004/0132368 and 2005/0081571 and U.S. Pat. Nos. 4,183,993, 5,160,776, 5,677,029 and 5,935,678.

Despite the advances taught by the aforementioned patents and applications, there is a need for cross-piles ballistic materials that can be produces with high productivity and simplified manufacture.

SUMMARY OF THE INVENTION

Provided is a multiaxial fabric comprising a first layer comprising a plurality of resin-free polyethylene yarns being substantially parallel in a first direction; a second layer comprising a plurality of resin-free polyethylene yarns being substantially parallel in a second direction and skew or offset with respect to the polyethylene yarns of the first layer; a layer, positioned between and contacting said first and second layers, comprising a thermoplastic or thermoset film; and a transverse yarn interlaced transversely. The first and second layers of yarns are substantially resin-free.

Also provided is a method for producing such fabrics.

BRIEF DESCRIPTION OF THE DRAWINGS

Embodiments are illustrated in the accompanying FIGURE to improve understanding of concepts as presented herein.

FIG. 1 includes an illustration of the use of multiple unidirectional layers and transverse fibers in the construction of a multiaxial fabric.

Skilled artisans appreciate that objects in the FIGURE are illustrated for simplicity and clarity and have not necessarily been drawn to scale. For example, the dimensions of some of the objects in the FIGURE may be exaggerated relative to other objects to help to improve understanding of embodiments.

DETAILED DESCRIPTION OF ILLUSTRATIVE EMBODIMENTS

Provided are multiaxial fabric comprising:

a first layer comprising substantially parallel and substantially resin-free polyethylene yarns oriented in a first direction;

a second layer comprising substantially parallel and substantially resin-free polyethylene oriented in a second direction, the first and second directions being skew with respect to each other;

a layer, interposed between and in contact with each of the first and second layers, and comprising a thermoplastic or thermoset film; and a yarn interlaced transversely among each of the layers of the multiaxial fabric.

In some embodiments, the fabric can be optionally coated with a polymer having a Tg of −40 to 0° C. and a zero shear melt viscosity of $2 \times 10^6$ to $10^{13}$ poise at 20° C. Some films comprise polyethylene.

In some fabrics, the yarns of the second layer are skew at an angle of 90° with respect to the yarns of the first layer.

In certain embodiments, the polyethylene has a number averaged molecular weight of at least 1 million.

The fabrics can optionally comprise an additional layer, positioned as a backing layer, said layer comprising an aramid felt. In some embodiments, the aramid felt comprises aramid staple fiber. In some embodiments, the aramid felt comprises poly(p-phenylene terphthalamide) staple.

Some fabrics can optionally comprise an additional layer, positioned as a backing layer, said layer comprising polypyridobisimidazole. One useful polypyridobisimidazole is poly [2,6-diimidazo[4,5-b:4,5-e]-pyridinylene-1,4(2,5-dihydroxy)phenylene).

In other embodiments, the optional backing layer comprises polyolefin felt. In some embodiments, the polyolefin felt comprises polyolefin staple fiber. In some embodiments, the polyolefin felt comprises polyethylene staple.

In certain embodiments, the transverse yarn comprises polyethylene fiber.

The fabrics can contain additional layers. In one embodiment, the fabric additionally comprises one or more layers, the layers being constructed to provide alternating layers comprising (i) substantially parallel resin-free polyethylene yarns, wherein said further polyethylene yarns are skew to the yarns in each adjacent layer and (ii) thermoplastic or thermoset film.

In some embodiments, the number of layers of polyethylene yarns is sufficient to pass NIJ ballistic standard 0101.04 for Level II and IIIA. In some embodiments, the fabric comprises at least 10 layers of polyethylene yarns.

Other aspects of the invention are directed to garments or articles comprising fabrics described herein.

Also provided area methods for manufacturing a multiaxial fabric comprising:

providing a thermoplastic or thermoset film; said film having a first and a second surface;

contacting a first layer comprising a plurality of first substantially resin-free polyethylene yarns being substantially parallel in a first direction with the first surface of the film;

contacting the film with a second layer comprising a plurality of substantially resin-free polyethylene yarns being substantially parallel in a second direction and skew or offset with respect to the first polyethylene yarns, wherein the second layer contacts the film on the second surface of the film; and transversely interlacing a transverse yarn within the multiaxial fabric.

The fabric can be consolidated by exposing it to elevated temperature and pressure to form a laminate.

The present invention may be understood more readily by reference to the following detailed description of illustrative and preferred embodiments that form a part of this disclosure. It is to be understood that the scope of the claims is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Numerous thermoplastic and thermoset films are know to those skilled in the art. Useful thermoplastic materials include polyolefins such as polyethylene and polypropylene, polyamide, polyester, or mixtures thereof. Thermoset materials include epoxy resins, polyester resins, phenolic resins, vinyl ester resins, and the like. In some embodiments, the thermoplastic or thermoset film comprises polyethylene.

For purposes herein, the term "fiber" is defined as a relatively flexible, macroscopically homogeneous body having a high ratio of length to width across its cross-sectional area perpendicular to its length. The fiber cross section can be any shape, but is typically round. The fibers can be present in uncoated, or coated, or otherwise pretreated (for example, pre-stretched or heat-treated) form. Herein, the term "filament" is used interchangeably with the term "fiber."

As used herein, the term "staple fibers" refers to fibers that are cut to a desired length or fibers that occur naturally with or naturally have a low ratio of length to width across its cross-sectional area perpendicular to its length when compared with filaments. Length can vary from about 0.1 inch to several feet. In some embodiments, the length is from 0.1 inch to about 8 inches. Man made staple fibers can be cut to a length suitable for processing on cotton, woolen, or worsted yarn spinning equipment.

The staple fibers can have (a) substantially uniform length, (b) variable or random length, or (c) subsets of the staple fibers have substantially uniform length and the staple fibers in the other subsets have different lengths, with the staple fibers in the subsets mixed together forming a substantially uniform distribution.

In some embodiments, suitable staple fibers have a length of 1 to 30 centimeters. Staple fibers made by short staple processes result in a fiber length of 1 to 6 centimeters.

The staple fibers can be made by any process. The staple fibers can be formed by stretch breaking continuous fibers resulting in staple fibers with deformed sections that act as crimps. The staple fibers can be cut from continuous straight fibers using a rotary cutter or a guillotine cutter resulting in straight (i.e., non crimped) staple fiber, or additionally cut from crimped continuous fibers having a saw tooth shaped crimp along the length of the staple fiber, with a crimp (or repeating bend) frequency of no more than 8 crimps per centimeter.

Stretch broken staple fibers can be made by breaking a tow or a bundle of continuous filaments during a stretch break operation having one or more break zones that are a prescribed distance creating a random variable mass of fibers having an average cut length controlled by break zone adjustment.

Staple fibers of this invention can be converted into yarns using traditional long and short staple ring spinning processes which are well known in the art. For short staple, cotton system spinning fiber lengths from ¾ inch to 2¼ inch (i.e., 1.9 to 5.7 cm.) are typically used. For long staple, worsted or woolen system spinning, fibers up to 6½ inches (i.e., 16.5 cm.) are typically used. However, this is not intended to be limiting to ring spinning because the yarns may also be spun using air jet spinning, open end spinning, and many other types of spinning which converts staple fiber into useable yarns.

The stretch broken staple fibers typically have length of up to 7 inches (i.e., 17.8 cm.) long and can be 15 made using traditional stretch-broken tow to top staple processes. Staple fibers having maximum lengths of up to around 20 inches (i.e., 51 cm) are possible through processes as described for example in PCT Patent Application No. WO 0077283. Yarns are so made by consolidated fibers into spun yarn using filament entanglement with air jets having a tenacity in the range of 3 to 7 grams per decitex. These yarns may have secondary twist, that is, they may be twisted after formation to impart more tenacity to the yarn, in which case the tenacity can be in the 10 to 18 grams per denier (i.e., 9 to 17 grams per dtex) range. Stretch broken staple fibers normally do not require crimp because the process imparts a degree of crimp into the fiber.

The term continuous filament refers to a flexible fiber having relatively small-diameter and whose length is longer than those indicated for staple fibers. Continuous filament fibers can be converted to multifilament yarns by processes well known to those skilled in the art.

As herein defined, "yarn" refers to a continuous length of two or more fibers, wherein fiber is as defined herein.

"Fabric" refers to any woven, knitted, or non-woven structure. In some embodiments, the fabrics are non-woven. By "non-woven" is meant a network of fibers, including unidirectional fibers, felt, and the like.

As used herein, the term "off-set" simply means not directly on top. The term "skew" when referring to two pluralities of yarn means that the pluralities lie at different angles relative to each other. Any angles that provide acceptable performance can be used. One skilled in the art is capable of determining optimum skew for a particular construction. For example, with two layers, the pluralities may be at 0 degrees and 90 degrees. Other examples are 0 degrees/45 degrees/90 degrees and 0 degrees/45 degrees/90 degrees/45 degrees.

Preferred polyolefins include polyethylene and polypropylene. By polyethylene is meant a predominantly linear polyethylene material with a weight averaged molecular weight of at least 150,000. In some embodiments, the weight averaged molecular weight is equal to or greater than one million, two million, or five million. These high molecular weight fibers can be produced in solution (see, U.S. Pat. Nos. 4,137,394 and 4,356,138), or may be spun from solution to form a gel (see, U.S. Pat. No. 4,413,110), or may be produced by a rolling and drawing process (see, U.S. Pat. No. 5,702,657).

The polyethylene chains can optionally contain minor amounts of chain branching or co-monomers not exceeding 5 modifying units per 100 main chain carbon atoms. The polymer can also contain, admixed therewith, not more than about 50 weight percent of one or more polymeric additives such as alkene-1-polymers, in particular low density polyethylene, propylene, and the like, or low molecular weight additives such as anti-oxidants, lubricants, ultra-violet screening agents, colorants and the like which are commonly incorporated. Such is commonly known as extended chain polyethylene (ECPE).

Those skilled in the art can provide polyolefin fibers having various properties by variation of the formation technique, the draw ratio and temperatures, and the like.

In preferred embodiments, the tenacity of the fibers should be at least 15 g/denier, 20 g/denier, 25 g/denier or 30 g/denier. Similarly, the initial tensile modulus of the fibers, as measured by an Instron® tensile testing machine, is at least 300 g/denier, 500 g/denier, 1,000 g/denier or 1,200 g/denier.

Polyethylene of weight average molecular weights from about 150,000 to two million typically has a melting point in the bulk of about 138° C. The highly oriented polyethylene filaments made of these materials, however, have melting points that are about 7 to about 13° C. higher. This increase in melting point is believed to reflect the crystalline perfection and higher crystalline orientation of the filaments as compared to the bulk polymer.

Similarly, polypropylene is a predominantly linear polypropylene material of having molecular weight and other properties similar to those discussed for polyethylene.

High molecular weight linear polyolefin fibers are commercially available. Preparation of Polyolefin Fibers, Including Polyethylene and Polypropylene, is Discussed in U.S. Pat. No. 4,457,985.

Examples of suitable fibers for use in the backing layers include those made from a polymer such as a polyolefin (for example, polyethylene or polypropylene), polyimide, polyester, poly(vinyl alcohol), polybenzazoles, such as polybenzimidazole (PBI), polyaramid, such as poly(paraphenylene terephthalamide) sold by E. I. du Pont de Nemours and Company (DuPont), Wilmington, Del. under the trade name KEVLAR®, and polypyridazoles, such as the polypyridobisimidazole available from Magellan Systems International, Richmond Va. under the trade name M5®. The tenacity of a fiber should be at least about 900 MPa according to ASTM D-885 in order to provide superior ballistic penetration resistance. Preferably, a fiber also has a modulus of at least about 10 GPa.

When the polymer is polyamide, aramid is preferred. By "aramid" is meant a polyamide wherein at least 85% of the amide (—CO—NH—) linkages are attached directly to two aromatic rings. Suitable aramid fibers are described in *Man-Made Fibers—Science and Technology*, Volume 2, Section titled Fiber-Forming Aromatic Polyamides, page 297, W. Black et al., Interscience Publishers, 1968. Aramid fibers are, also, disclosed in U.S. Pat. Nos. 4,172,938; 3,869,429; 3,819,587; 3,673,143; 3,354,127; and 3,094,511. Additives can be used with the aramid and it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride or the aramid.

The preferred aramid is a para-aramid and poly(p-phenylene terephthalamide)(PPD-T) is the preferred para-aramid. By PPD-T is meant the homopolymer resulting from approximately mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride or 3,4'-diaminodiphenylether.

When the polymer is polyolefin, polyethylene or polypropylene are preferred. By polyethylene is meant a predominantly linear polyethylene material of preferably more than one million molecular weight that may contain minor amounts of chain branching or comonomers not exceeding 5 modifying units per 100 main chain carbon atoms, and that may also contain admixed therewith not more than about 50 weight percent of one or more polymeric additives such as alkene-1-polymers, in particular low density polyethylene, propylene, and the like, or low molecular weight additives such as anti-oxidants, lubricants, ultra-violet screening agents, colorants and the like which are commonly incorporated. One such polymer is commonly known as extended chain polyethylene (ECPE). Similarly, polypropylene is preferably a predominantly linear polypropylene material of more than one million molecular weight. High molecular weight linear polyolefin fibers are commercially available. Preparation of polyolefin fibers is discussed in U.S. Pat. No. 4,457,985.

Polyareneazole polymers, such as polybenzazoles and polypyridazoles, can be made by reacting a mix of dry ingredients with a polyphosphoric acid (PPA) solution. The dry ingredients may comprise azole-forming monomers and metal powders. Accurately weighed batches of these dry ingredients can be obtained through employment of at least some of the preferred embodiments of the present invention.

Exemplary azole-forming monomers include 2,5-dimercapto-p-phenylene diamine, terephthalic acid, bis-(4-benzoic acid), oxy-bis-(4-benzoic acid), 2,5-dihydroxyterephthalic acid, isophthalic acid, 2,5-pyridodicarboxylic acid, 2,6-napthalenedicarboxylic acid, 2,6-quinolinedicarboxylic acid, 2,6-bis(4-carboxyphenyl)pyridobisimidazole, 2,3,5,6-tetraminopyridine, 4,6-diaminoresorcinol, 2,5-diaminohydroquinone, 1,4-diamino-2,5-dithiobenzene, or any combination thereof. Preferably, the azole forming monomers include 2,3,5,6-tetraminopyridine and 2,5-dihydroxyterephthalic acid. In certain embodiments, it is preferred that that the azole-forming monomers are phosphorylated. Preferably, phosphorylated azole-forming monomers are polymerized in the presence of polyphosphoric acid and a metal catalyst.

Metal powders can be employed to help build the molecular weight of the final polymer. The metal powders typically include iron powder, tin powder, vanadium powder, chromium powder, and any combination thereof.

The azole-forming monomers and metal powders are mixed and then the mixture is reacted with polyphosphoric acid to form a polyareneazole polymer solution. Additional polyphosphoric acid can be added to the polymer solution if desired. The polymer solution is typically extruded or spun through a die or spinneret to prepare or spin the filament.

Polybenzoxazole (PBO) and polybenzothiazole (PBZ) are two suitable polybenzazole polymers. These polymers are described in PCT Application No. WO 93/20400. Polybenzoxazole and polybenzothiazole are preferably made up of repetitive units of the following structures:

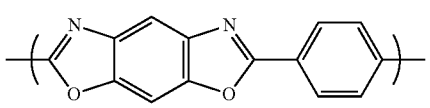

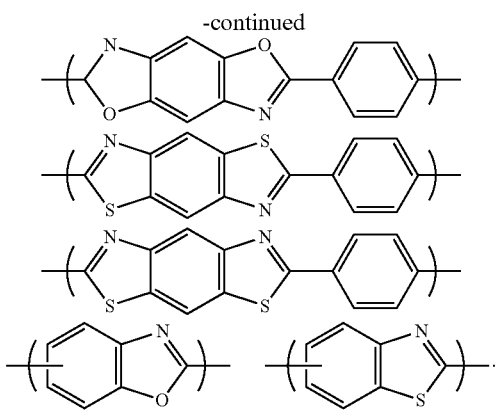

While the aromatic groups shown joined to the nitrogen atoms may be heterocyclic, they are preferably carbocyclic; and while they may be fused or unfused polycyclic systems, they are preferably single six-membered rings. While the group shown in the main chain of the bis-azoles is the preferred para-phenylene group, that group may be replaced by any divalent organic group which doesn't interfere with preparation of the polymer, or no group at all. For example, that group may be aliphatic up to twelve carbon atoms, tolylene, biphenylene, bis-phenylene ether, and the like.

The polybenzoxazole and polybenzothiazole used to make fibers of this invention should have at least 25 and preferably at least 100 repetitive units. Preparation of the polymers and spinning of those polymers is disclosed in PCT Patent Application No. WO 93/20400.

Fibers made from poly(pyridazole) polymers are suitable for use in the present invention. These polymers include poly (pyridimidazle), poly(pyridothiazole), poly(pyridoxazole), poly(pyridobisimidazole), poly(pyridobisthiazole), and poly (pyridobisoxazole).

Poly(pryidobisimidazole) is a rigid rod polymer that is of high strength. The poly(pyridobisimidazole) fiber can have an inherent viscosity of at least 20 dl/g or at least 25 dl/g or at least 28 dl/g. Such fibers include PIPD fiber (also known as M5® fiber and fiber made from poly[2,6-d]imidazo[4,5-b:4,5-e]-pyridinylene-1,4(2,5-dihydroxy)phenylene). PIPD fiber is based on the structure:

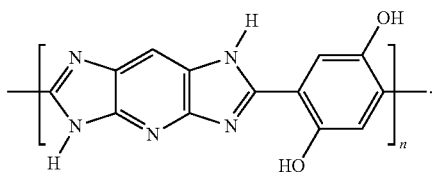

Poly(pyridobisimidazole) fiber can be distinguished from the well known commercially available PBI fiber or poly (benzimidazole) fiber in that that poly(benzimidazole) fiber is a poly(bibenzimidazole). Poly(bibenzimidazole) fiber is not a rigid rod polymer and has low fiber strength and low tensile modulus when compared to poly(pyridobisimidazoles).

PIPD fibers have been reported to have the potential to have an average modulus of about 310 GPa (2100 grams/denier) and an average tenacities of up to about 5.8 GPa (39.6 grams/denier). These fibers have been described by Brew, et al., *Composites Science and Technology* 1999, 59, 1109; Van der Jagt and Beukers, *Polymer* 1999, 40, 1035; Sikkema, *Polymer* 1998, 39, 5981; Klop and Lammers, *Polymer,* 1998, 39, 5987; Hageman, et al., *Polymer* 1999, 40, 1313.

As used herein, when a layer is said to have "substantially resin-free polyethylene yarns," it is meant that the layer has less than 10% by weight of resin. In some embodiments, the layer has less than 5% by weight of resin. In other embodiments, a layer can have less than 1% by weight of resin, or even no resin.

Protective body armor is one major application for this invention. The high performance fiber structure may be manufactured into body armor by a standard vest-making process such as stitching. Body armor is constructed by manufacturers in order to meet penetration resistance, blunt trauma, and other requirements as established by the National Institute of Justice via NIJ 100-98. According to NIJ 100-98, the manner in which the ballistic panels are assembled into a single unit differs from one manufacturer to another. In some cases, the multiple layers are bias stitched around the entire edge of the panel; in others, the layers are tack stitched together at several locations. Some manufacturers assemble the fabrics with a number of rows of vertical or horizontal stitching; some may even quilt the entire ballistic panel. No evidence exists that stitching impairs the ballistic-resistant properties of a panel. Instead, stitching tends to improve the overall performance, especially in cases of blunt trauma, depending upon the type of fabric used.

The invention is exemplified by the following examples which are not intended to limit the scope of the invention.

EXAMPLES

This invention will now be illustrated by the following specific examples:

Comparative Example

In Comparative Example 1, Polyethylene cross-plied UD available from Honeywell under the trademark Spectrashield® Plus was used. The Spectrashield Plus was produced by the following several major steps (1) making an unidirectional layer in which the fibers in each layer run virtually parallel and were substantially coated with a resin matrix, (2) cross-plying two unidirectional layers via cutting and laying one unidirectional layer piece-wisely normal to the second unidirectional layer with a polyethylene film covered on both sides of the unidirectional layer, and (3) pressing the cross-plied UD under high temperature and pressure (U.S. Pat. No. 5,173,138). The areal density of Spectrashield Plus is about 114 g/m².

Thirty-six layers of Spectrashield Plus with a size of about 15'×15" and a total areal density of about 4.1 kg/m² were tacked on four corners only. The assembly was then tested against 0.357 magnum bullet to determine the ballistic V50 in accordance with NIJ standard—0101.04. The ballistic V50 was about 485 m/s.

Example

In the Example 1 of this invention, layers of biaxial fabric were made from high strength polyethylene fiber of 1440 dtex, available from Honeywell under the trademark Spectra® 1000. Each layer of the biaxial fabric is constructed with a first set of resin-free parallel yarns arranged at 11.6 ends/cm, a thin layer (about 9μ) of low density polyethylene film with an areal density of about 7.8 g/m² available from Raven Industries Inc., then followed by a second set of resin-free parallel yarns arranged at 11.6 ends/cm positioned normal to the first sets of yarns, and a third set of loop-forming yarns of 110 dtex polyester yarns run transversely through the first set of yarns, film, and the second set of yarns, to stabilize the biaxial fabric. Areal density of the biaxial layer of this invention is about 342 g/m$^2$, which is about three times heavier than that of Spectrashield plus. The biaxial fabric of this invention with the film sandwiched between the first and second sets of yarns is made in one step with high productivity and any desired width. Biaxial fabric of this invention is cut into layers of about 15"×15" size and further consolidated in a heat press at about 110° C. and 0.5 MPa for about 10 minutes with each layer separated by a release film. Twelve layers of the consolidated biaxial fabric of this invention with a total areal density of about 4.1 kg/m$^2$ are tack around four corners only, and then tested against 0.357 magnum bullet per NIJ ballistic standard 0101.04 for ballistic V50. The result is expected to be at least equal to that of the Comparative Example 1 at a significantly lower number of layers, i.e. about one third of the Comparative Example 1, and lower cost for assembling the ballistic articles made of this invention.

What is claimed:

1. A multiaxial fabric comprising:
   a first layer comprising substantially parallel and substantially resin-free polyethylene yarns oriented in a first direction;
   a second layer comprising substantially parallel and substantially resin-free polyethylene yarns oriented in a second direction, the first and second directions being skew with respect to each other;
   a layer, interposed between and in contact with each of the first and second layers, and comprising a thermoplastic or thermoset film; and
   a yarn interlaced transversely among each of the layers of the multiaxial fabric, wherein the fabric is coated with a high viscosity polymer that has a Tg in the range of −40 to 0° C., and a zero shear melt viscosity of $2\times10^6$ to $10^{13}$ poise at 20° C.;
   the yarns of the second layer are skew at an angle of 90° with respect to the yarns of the first layer; and
   the polyethylene has a number averaged molecular weight of at least 1 million.

2. The fabric of claim 1, wherein the yarns of the second layer are skew at an angle of 90° with respect to the yarns of the first layer.

3. The fabric of claim 1, wherein the polyethylene has a number averaged molecular weight of at least 1 million.

4. The fabric of claim 1, wherein the thermoplastic or thermoset film comprises polyethylene.

5. The fabric of claim 1, comprising an additional layer, positioned as a backing layer, said layer comprising an aramid felt.

6. The fabric of claim 5, wherein the aramid felt comprises aramid staple fiber.

7. The fabric of claim 5, wherein the aramid felt comprises poly(p-phenylene terphthalamide) staple.

8. The fabric of claim 1, comprising an additional layer, positioned as a backing layer, said layer comprising polypyridobisimidazole.

9. The fabric of claim 8 wherein polypyridobisimidazole is poly[2,6-diimidazo[4,5-b:4,5-e]-pyridinylene-1,4(2,5-dihydroxy)phenylene).

10. The fabric of claim 1, comprising an additional layer, positioned as a backing layer, said layer comprising an polyolefin felt.

11. The fabric of claim 10, wherein the polyolefin felt comprises polyolefin staple fiber.

12. The fabric of claim 10, wherein the polyolefin felt comprises polyethylene staple.

13. The fabric of claim 1, wherein the transverse yarn comprises polyethylene fiber.

14. The fabric of claim 1, additionally comprising one or more layers, said layers being constructed to provide alternating layers comprising (i) polyethylene yarns that are substantially resin-free and substantially parallel, wherein said further polyethylene yarns are skew to the yarns in each adjacent layer and (ii) thermoplastic or thermoset film.

15. The fabric of claim 14, comprising at least 10 layers of polyethylene yarns.

16. A garment comprising the fabric of claim 1.

17. An article comprising the fabric of claim 1.

18. A method of manufacturing a multiaxial fabric comprising:
   providing a thermoplastic or thermoset film; said film having a first and a second surface;
   contacting a first layer comprising a plurality of substantially resin-free polyethylene yarns being substantially parallel in a first direction with the first surface of the film;
   contacting a second layer comprising a plurality of substantially resin-free polyethylene yarns being substantially parallel in a second direction and skew or offset with respect to the polyethylene yarns of the first layer with the film, wherein the second layer contacts the film on the second surface of the film; and
   transversely interlacing a transverse yarn within the multiaxial fabric, wherein:
   the fabric is coated with a high viscosity polymer that has a Tg in the range of −40 to 0° C., and a zero shear melt viscosity of $2\times10^6$ to $10^{13}$ poise at 20° C.;
   the yarns of the second layer are skew at an angle of 90° with respect to the yarns of the first layer; and
   the polyethylene has a number averaged molecular weight of at least 1 million.

* * * * *